United States Patent
Fürst et al.

(10) Patent No.: US 9,712,923 B2
(45) Date of Patent: Jul. 18, 2017

(54) VAD DETECTION MICROPHONE AND METHOD OF OPERATING THE SAME

(71) Applicant: Knowles Electronics, LLC, Itasca, IL (US)

(72) Inventors: Claus Erdmann Fürst, Roskilde (DK); Henrik Thomsen, Holte (DK); Michael Deruginsky, Hillerød (DK); Dibyendu Nandy, Naperville, IL (US); Oddy Nopporn Khamharn, Addison, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/282,101

(22) Filed: May 20, 2014

(65) Prior Publication Data

US 2014/0348345 A1    Nov. 27, 2014

Related U.S. Application Data

(60) Provisional application No. 61/826,587, filed on May 23, 2013.

(51) Int. Cl.
*H04R 19/04* (2006.01)
*H04R 17/02* (2006.01)
(Continued)

(52) U.S. Cl.
CPC .............. *H04R 17/02* (2013.01); *G10L 15/00* (2013.01); *G10L 25/78* (2013.01); *H04R 1/08* (2013.01);
(Continued)

(58) Field of Classification Search
CPC ........ H04R 3/00; H04R 17/02; H04R 19/005; H04R 19/04; G10L 15/00
(Continued)

(56) References Cited

U.S. PATENT DOCUMENTS

| 4,052,568 A | 10/1977 | Jankowski |
| 5,577,164 A | 11/1996 | Kaneko |

(Continued)

FOREIGN PATENT DOCUMENTS

| JP | 2001236095 A | 8/2001 |
| JP | 2004219728 | 8/2004 |

(Continued)

OTHER PUBLICATIONS

International Search Report and Written Opinion for PCT/US2014/038790, dated Sep. 24, 2014 (9 pages).
(Continued)

*Primary Examiner* — Fan Tsang
*Assistant Examiner* — Eugene Zhao
(74) *Attorney, Agent, or Firm* — Foley & Lardner LLP

(57) ABSTRACT

A microphone includes a microelectromechanical system (MEMS) circuit and an integrated circuit. The MEMS circuit is configured to convert a voice signal into an electrical signal, and the integrated circuit is coupled to the MEMS circuit and is configured to receive the electrical signal. The integrated circuit and the MEMS circuit receive a clock signal from an external host. The clock signal is effective to cause the MEMS circuit and integrated circuit to operate in full system operation mode during a first time period and in a voice activity mode of operation during a second time period. The voice activity mode has a first power consumption and the full system operation mode has a second power consumption. The first power consumption is less than the second power consumption. The integrated circuit is configured to generate an interrupt upon the detection of voice activity, and send the interrupt to the host.

19 Claims, 3 Drawing Sheets

(51) Int. Cl.
*H04R 1/08* (2006.01)
*G10L 25/78* (2013.01)
*H04R 3/00* (2006.01)
*G10L 15/00* (2013.01)
*H04R 19/00* (2006.01)

(52) U.S. Cl.
CPC ............ *H04R 3/00* (2013.01); *H04R 19/005* (2013.01); *H04R 19/04* (2013.01); *H04R 2201/003* (2013.01)

(58) Field of Classification Search
USPC ..................... 381/26, 91–95, 111; 700/94
See application file for complete search history.

(56) References Cited

U.S. PATENT DOCUMENTS

| | | |
|---|---|---|
| 5,598,447 A | 1/1997 | Usui |
| 5,675,808 A | 10/1997 | Gulick et al. |
| 5,822,598 A | 10/1998 | Lam |
| 5,983,186 A | 11/1999 | Miyazawa |
| 6,049,565 A | 4/2000 | Paradine et al. |
| 6,057,791 A | 5/2000 | Knapp |
| 6,070,140 A | 5/2000 | Tran |
| 6,154,721 A | 11/2000 | Sonnic |
| 6,249,757 B1 | 6/2001 | Cason |
| 6,259,291 B1 | 7/2001 | Huang |
| 6,282,268 B1 | 8/2001 | Hughes |
| 6,324,514 B2 | 11/2001 | Matulich |
| 6,397,186 B1 | 5/2002 | Bush et al. |
| 6,453,020 B1 | 9/2002 | Hughes |
| 6,564,330 B1 | 5/2003 | Martinez |
| 6,591,234 B1 | 7/2003 | Chandran |
| 6,640,208 B1 | 10/2003 | Zhang |
| 6,756,700 B2 | 6/2004 | Zeng |
| 6,829,244 B1* | 12/2004 | Wildfeuer ............. H04J 3/0632 370/412 |
| 7,190,038 B2 | 3/2007 | Dehe |
| 7,415,416 B2 | 8/2008 | Rees |
| 7,473,572 B2 | 1/2009 | Dehe |
| 7,619,551 B1 | 11/2009 | Wu |
| 7,630,504 B2 | 12/2009 | Poulsen |
| 7,774,202 B2 | 8/2010 | Spengler |
| 7,774,204 B2 | 8/2010 | Mozer et al. |
| 7,781,249 B2 | 8/2010 | Laming |
| 7,795,695 B2 | 9/2010 | Weigold |
| 7,825,484 B2 | 11/2010 | Martin |
| 7,829,961 B2 | 11/2010 | Hsiao |
| 7,856,283 B2 | 12/2010 | Burk et al. |
| 7,856,804 B2 | 12/2010 | Laming |
| 7,903,831 B2 | 3/2011 | Song |
| 7,936,293 B2 | 5/2011 | Hamashita |
| 7,941,313 B2 | 5/2011 | Garudadri |
| 7,957,972 B2 | 6/2011 | Huang et al. |
| 7,994,947 B1 | 8/2011 | Ledzius |
| 8,171,322 B2 | 5/2012 | Fiennes |
| 8,208,621 B1 | 6/2012 | Hsu |
| 8,275,148 B2 | 9/2012 | Li et al. |
| 8,331,581 B2 | 12/2012 | Pennock |
| 8,666,751 B2 | 3/2014 | Murthi et al. |
| 8,687,823 B2 | 4/2014 | Loeppert |
| 8,731,210 B2 | 5/2014 | Cheng |
| 8,798,289 B1 | 8/2014 | Every |
| 8,804,974 B1 | 8/2014 | Melanson |
| 8,831,246 B2* | 9/2014 | Josefsson ................ H04R 3/00 381/107 |
| 8,849,231 B1 | 9/2014 | Murgia |
| 8,972,252 B2 | 3/2015 | Hung et al. |
| 8,996,381 B2 | 3/2015 | Mozer et al. |
| 9,020,819 B2 | 4/2015 | Saitoh |
| 9,043,211 B2 | 5/2015 | Haiut et al. |
| 9,059,630 B2 | 6/2015 | Gueorguiev |
| 9,073,747 B2 | 7/2015 | Ye |
| 9,076,447 B2 | 7/2015 | Nandy |
| 9,111,548 B2 | 8/2015 | Nandy |
| 9,112,984 B2 | 8/2015 | Sejnoha et al. |
| 9,113,263 B2 | 8/2015 | Furst |
| 9,119,150 B1 | 8/2015 | Murgia |
| 9,142,215 B2 | 9/2015 | Rosner |
| 9,147,397 B2 | 9/2015 | Thomsen |
| 9,161,112 B2 | 10/2015 | Ye |
| 2002/0054588 A1 | 5/2002 | Mehta et al. |
| 2002/0116186 A1 | 8/2002 | Strauss |
| 2002/0123893 A1 | 9/2002 | Woodward |
| 2002/0184015 A1 | 12/2002 | Li |
| 2003/0004720 A1 | 1/2003 | Garudadri et al. |
| 2003/0061036 A1 | 3/2003 | Garudadri |
| 2003/0091000 A1 | 5/2003 | Chu |
| 2003/0138061 A1* | 7/2003 | Li ............................ H04B 3/23 375/326 |
| 2003/0144844 A1 | 7/2003 | Colmenarez |
| 2004/0022379 A1 | 2/2004 | Klos |
| 2005/0207605 A1 | 9/2005 | Dehe |
| 2006/0013415 A1* | 1/2006 | Winchester ......... G10L 21/0208 381/110 |
| 2006/0074658 A1 | 4/2006 | Chadha |
| 2006/0233389 A1* | 10/2006 | Mao ...................... H04R 1/406 381/92 |
| 2006/0247923 A1 | 11/2006 | Chandran |
| 2007/0127761 A1 | 6/2007 | Poulsen |
| 2007/0168908 A1 | 7/2007 | Paolucci et al. |
| 2007/0274297 A1 | 11/2007 | Cross et al. |
| 2007/0278501 A1 | 12/2007 | Macpherson |
| 2008/0089536 A1 | 4/2008 | Josefsson |
| 2008/0120098 A1 | 5/2008 | Makinen |
| 2008/0175425 A1 | 7/2008 | Roberts |
| 2008/0201138 A1 | 8/2008 | Visser |
| 2008/0267431 A1 | 10/2008 | Leidl |
| 2008/0279407 A1 | 11/2008 | Pahl |
| 2008/0283942 A1 | 11/2008 | Huang |
| 2009/0001553 A1 | 1/2009 | Pahl |
| 2009/0022172 A1 | 1/2009 | Haberman |
| 2009/0180655 A1 | 7/2009 | Tien |
| 2009/0234645 A1* | 9/2009 | Bruhn .................... G10L 19/24 704/205 |
| 2010/0046780 A1 | 2/2010 | Song |
| 2010/0052082 A1 | 3/2010 | Lee |
| 2010/0057474 A1 | 3/2010 | Kong |
| 2010/0128894 A1 | 5/2010 | Petit |
| 2010/0128914 A1 | 5/2010 | Khenkin |
| 2010/0131783 A1 | 5/2010 | Weng |
| 2010/0183181 A1 | 7/2010 | Wang |
| 2010/0246877 A1 | 9/2010 | Wang |
| 2010/0290644 A1 | 11/2010 | Wu |
| 2010/0292987 A1 | 11/2010 | Kawaguchi |
| 2010/0322443 A1 | 12/2010 | Wu |
| 2010/0322451 A1 | 12/2010 | Wu |
| 2011/0007907 A1 | 1/2011 | Park |
| 2011/0013787 A1 | 1/2011 | Chang |
| 2011/0029109 A1 | 2/2011 | Thomsen et al. |
| 2011/0075875 A1 | 3/2011 | Wu |
| 2011/0106533 A1 | 5/2011 | Yu |
| 2011/0208520 A1 | 8/2011 | Lee |
| 2011/0280109 A1 | 11/2011 | Raymond |
| 2012/0010890 A1 | 1/2012 | Koverzin |
| 2012/0112804 A1 | 5/2012 | Li et al. |
| 2012/0113899 A1 | 5/2012 | Overmars |
| 2012/0232896 A1 | 9/2012 | Taleb et al. |
| 2012/0250881 A1* | 10/2012 | Mulligan ........................ 381/92 |
| 2012/0250910 A1 | 10/2012 | Shajaan et al. |
| 2012/0310641 A1 | 12/2012 | Niemisto et al. |
| 2013/0035777 A1* | 2/2013 | Niemisto ............ G10L 21/0208 700/94 |
| 2013/0044898 A1 | 2/2013 | Schultz |
| 2013/0058495 A1 | 3/2013 | Furst et al. |
| 2013/0058506 A1 | 3/2013 | Boor |
| 2013/0223635 A1 | 8/2013 | Singer et al. |
| 2013/0226324 A1 | 8/2013 | Hannuksela |
| 2013/0246071 A1 | 9/2013 | Lee |
| 2013/0322461 A1 | 12/2013 | Poulsen |
| 2013/0343584 A1* | 12/2013 | Bennett et al. ................ 381/315 |
| 2014/0064523 A1 | 3/2014 | Kropfitsch |
| 2014/0122078 A1 | 5/2014 | Joshi |
| 2014/0143545 A1 | 5/2014 | McKeeman |

(56) References Cited

U.S. PATENT DOCUMENTS

| | | |
|---|---|---|
| 2014/0163978 A1 | 6/2014 | Basye et al. |
| 2014/0177113 A1 | 6/2014 | Gueorguiev |
| 2014/0188467 A1 | 7/2014 | Jing |
| 2014/0188470 A1 | 7/2014 | Chang |
| 2014/0197887 A1 | 7/2014 | Hovesten |
| 2014/0244269 A1 | 8/2014 | Tokutake |
| 2014/0244273 A1 | 8/2014 | Laroche |
| 2014/0249820 A1 | 9/2014 | Hsu |
| 2014/0257813 A1 | 9/2014 | Mortensen |
| 2014/0257821 A1 | 9/2014 | Adams et al. |
| 2014/0270260 A1 | 9/2014 | Goertz et al. |
| 2014/0274203 A1 | 9/2014 | Ganong et al. |
| 2014/0278435 A1* | 9/2014 | Ganong et al. ............... 704/275 |
| 2014/0281628 A1 | 9/2014 | Nigam et al. |
| 2014/0343949 A1 | 11/2014 | Huang et al. |
| 2014/0348345 A1 | 11/2014 | Furst |
| 2014/0358552 A1 | 12/2014 | Xu |
| 2015/0039303 A1 | 2/2015 | Lesso |
| 2015/0043755 A1 | 2/2015 | Furst |
| 2015/0046157 A1 | 2/2015 | Wolff |
| 2015/0046162 A1 | 2/2015 | Aley-Raz |
| 2015/0049884 A1 | 2/2015 | Ye |
| 2015/0055803 A1 | 2/2015 | Qutub |
| 2015/0058001 A1 | 2/2015 | Dai |
| 2015/0063594 A1 | 3/2015 | Nielsen |
| 2015/0073780 A1 | 3/2015 | Sharma |
| 2015/0073785 A1 | 3/2015 | Sharma |
| 2015/0088500 A1 | 3/2015 | Conliffe |
| 2015/0106085 A1 | 4/2015 | Lindahl |
| 2015/0110290 A1 | 4/2015 | Furst |
| 2015/0112690 A1 | 4/2015 | Guha et al. |
| 2015/0134331 A1 | 5/2015 | Millet et al. |
| 2015/0154981 A1 | 6/2015 | Barreda |
| 2015/0161989 A1 | 6/2015 | Hsu |
| 2015/0195656 A1 | 7/2015 | Ye |
| 2015/0206527 A1 | 7/2015 | Connolly |
| 2015/0256660 A1 | 9/2015 | Kaller |
| 2015/0256916 A1 | 9/2015 | Volk |
| 2015/0287401 A1 | 10/2015 | Lee |
| 2015/0302865 A1 | 10/2015 | Pilli |
| 2015/0304502 A1 | 10/2015 | Pilli |
| 2015/0350760 A1 | 12/2015 | Nandy |
| 2015/0350774 A1 | 12/2015 | Furst |
| 2016/0012007 A1 | 1/2016 | Popper |
| 2016/0087596 A1 | 3/2016 | Yurrtas |
| 2016/0133271 A1 | 5/2016 | Kuntzman |
| 2016/0134975 A1 | 5/2016 | Kuntzman |

FOREIGN PATENT DOCUMENTS

| | | |
|---|---|---|
| WO | 2009130591 | 10/2009 |
| WO | 2011106065 A1 | 9/2011 |
| WO | 2011140096 | 11/2011 |
| WO | 2013049358 | 4/2013 |
| WO | 2013085499 | 6/2013 |

OTHER PUBLICATIONS

Search Report for PCT/EP2014/064324, dated Feb. 12, 2015, 13 pages.
"MEMS technologies: Microphone" EE Herald Jun. 20, 2013.
Delta-sigma modulation, Wikipedia (Jul. 4, 2013).
Pulse-density modulation, Wikipedia (May 3, 2013).
Kite, Understanding PDM Digital Audio, Audio Precision, Beaverton, OR, 2012.
International Search Report and Written Opinion for PCT/US2014/060567 dated Jan. 16, 2015 (12 pages).
International Search Report and Written Opinion for PCT/US2014/062861 dated Jan. 23, 2015 (12 pages).
U.S. Appl. No. 14/285,858, filed May 22, 2014, Santos.
U.S. Appl. No. 14/495,482, filed Sep. 24, 2014, Murgia.
U.S. Appl. No. 14/522,264, filed Oct. 23, 2014, Murgia.
U.S. Appl. No. 14/698,652, filed Apr. 28, 2015, Yapanel.
U.S. Appl. No. 14/749,425, filed Jun. 24, 2015, Verma.
U.S. Appl. No. 14/853,947, Sep. 14, 2015, Yen.
U.S. Appl. No. 62/100,758, Jan. 7, 2015, Rossum.
International Search Report and Written Opinion for PCT/US2016/013859 dated Apr. 29, 2016 (12 pages).
Search Report of Taiwan Patent Application No. 103135811, dated Apr. 18, 2016 (1 page).
U.S. Appl. No. 14/797,310, filed Jul. 13, 2015, entitled "Microphone Apparatus and Method With Catch-Up Buffer".
U.S. Appl. No. 14/989,445, filed Jan. 6, 2016, entitled "Utilizing Digital Microphones for Low Power Keyword Detection and Noise Suppression".
U.S. Appl. No. 14/698,652, filed Apr. 28, 2015, entitled "Keyword Sensing Voice Activity Detection".

* cited by examiner

VAD DETECTION MICROPHONE AND METHOD OF OPERATING THE SAME

CROSS REFERENCE TO RELATED APPLICATIONS

This patent claims benefit under 35 U.S.C. §119 (e) to U.S. Provisional Application No. 61/826,587 entitled "VAD detection Microphone and Method of Operating the Same" filed May 23, 2013, the content of which is incorporated herein by reference in its entirety.

TECHNICAL FIELD

This disclosure relates to microphones and, more specifically, to voice activity detection (VAD) approaches used with these microphones.

BACKGROUND

Microphones are used to obtain a voice signal from a speaker. Once obtained, the signal can be processed in a number of different ways. A wide variety of functions can be provided by today's microphones and they can interface with and utilize a variety of different algorithms.

Voice triggering, for example, as used in mobile systems is an increasingly popular feature that customers wish to use. For example, a user may wish to speak commands into a mobile device and have the device react in response to the commands. In these cases, a digital signal process (DSP) will first detect if there is voice in an audio signal captured by a microphone, and then, subsequently, analysis is performed on the signal to predict what the spoken word was in the received audio signal. Various voice activity detection (VAD) approaches have been developed and deployed in various types of devices such as cellular phone and personal computers.

In the use of these approaches, power consumption becomes a concern. Lower power consumption gives longer standby time. For today's smart-phones (in particular), the use of power is a key parameter. Unfortunately, present approaches of operating microphones use and waste much power. This has resulted in user dissatisfaction with these previous approaches and systems.

BRIEF DESCRIPTION OF THE DRAWINGS

For a more complete understanding of the disclosure, reference should be made to the following detailed description and accompanying drawings wherein.

Figure 1:
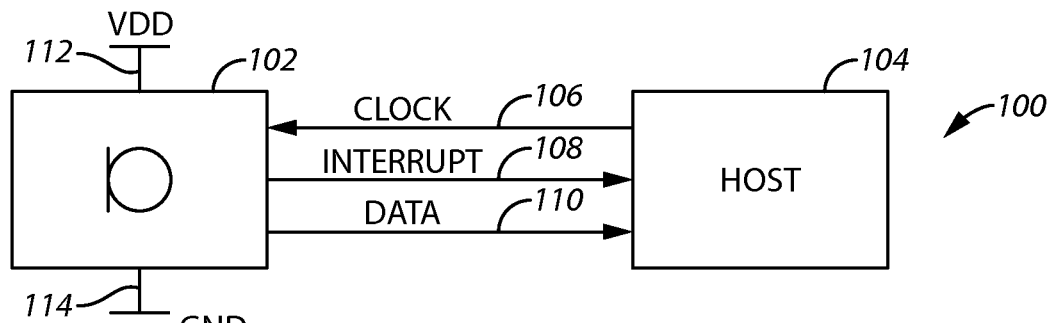
FIG. 1 is a block diagram of a system with microphone that uses a VAD algorithm and includes power savings features.

Those of ordinary skill in the art will appreciate that elements in the figures are illustrated for simplicity and clarity. It will be appreciated further that certain actions and/or steps may be described or depicted in a particular order of occurrence while those of ordinary skill in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches change the way that present mobile systems are partitioned, the functionality of the microphone, and the modes in which it can operate. In these regards, a microphone with a voice or event detection block is presented and this enables the microphone to generate an interrupt signal which can wake the system up.

In some aspects, the microphones described herein include five external connections. The first connection may be a power connection and the second connection may be a ground connection. The third, fourth, and fifth connections are connections from the microphone to a host device (e.g., host circuitry in the device in which the microphone resides). More specifically, the third connection may be a data connection, the fourth connection may be an interrupt (sent from the microphone to the host), and the fifth connection may be a clock signal (sent from the host to the microphone).

The microphone may have several modes of operation and these are controlled by a clock signal. The host receives a data signal from the microphone as well as an interrupt signal. The host has multiple power modes controlled by the interrupt signal generated by the microphone. The host generates the clock signal for the microphone and thereby controls the mode of operation of the microphone. In one example, the absence of a clock causes the microphone to enter voice activity detection (VAD) mode.

In one example, the microphone includes a VAD mode of operation. In this mode of operation, the microphone has a very low power consumption, and it runs on a relatively low clock frequency which can be supplied either externally (from the host) or from an on-chip oscillator.

This operation enables very low power consumption levels as only the most necessary signal processing is active during this mode. In one aspect, the analog signal processing blocks of the microphone (such as the microphone preamplifier, the analog to digital converter, the voltage regulators and the charge pump supplying the bias voltage for the MicroElectroMechanicalSystem (MEMS) microphone) operate at lower power. In this mode, these blocks are operated at reduced power enough for achieving the bandwidth and signal to noise ratio (SNR) needed for the VAD or event detector to function. For example, a bandwidth of operation of approximately 8 kHz after decimation and an SNR of approximately 60 dB can be achieved.

The VAD or event detector can be implemented using well known techniques. For example, short term energy measures vs. long term energy measures, zero crossing and so forth can be used to detect voice signals.

It should also be noted that the interface (the connections between the host and the microphone) is not limited to the exact signals described herein. In these regards, other signals or other combinations of signals may be used. The physical implementation of the interface may also vary. For example, it may be a single physical bi-directional line, or multiple uni-directional lines.

In other aspects, the microphone further includes a delay buffer. In other examples, upon wake-up, buffered data is transmitted over a first transmission line and real-time data is transmitted simultaneously over a second and separate output lines. In still other examples, buffered data is flushed or discarded upon switching modes.

In still other aspects, the microphone is over-clocked to catch up buffered data to real time data. The microphone can also be used for multi-microphone voice triggered applications. In one example, the microphone wakes up and enables data synchronizations of a second microphone either in a buffered or a real time mode.

Referring now to FIG. 1, a system 100 that uses a microphone 102 having a VAD algorithm and includes power savings features is described. The microphone 102 may in one example, include a MEMS chip (with MEMS die, diaphragm, and charge plate) and an application specific integrated circuit (ASIC). The system also includes a host 104. The host 104 may include various processing functions and may be part of a device (e.g., a personal computer or cellular phone, mobile handset, or tablet) where the microphone 102 resides.

A VDD power signal 112 and a ground signal 114 are coupled to the microphone 102. An interrupt signal 108 and a data signal 110 are sent from the microphone 102 to the host 104. A clock signal 106 is sent from the host 104 to the microphone 102.

In one example of the operation of the system 100 of FIG. 1, the microphone 102 has several modes of operation and these are controlled by the clock signal 106. The host 104 receives the data signal 110 from the microphone 102 as well as an interrupt signal 108. The host 104 has multiple power modes controlled by the interrupt signal 108 that is generated by the microphone 102 upon the detection of voice activity or a particular voice event (e.g., a specific spoken word). The host 104 generates the clock signal 106 for the microphone 102 and thereby controls the mode of operation of the microphone 102.

In one example, the microphone 102 includes a VAD mode of operation. In this mode, the microphone 102 has a very low power consumption, and it runs on a relatively low clock frequency which can be supplied either externally (from the clock signal 106 supplied by the host 104) or from an internal on-chip oscillator in the microphone 102. Consequently, when an interrupt is made, the low power operation can be changed to a higher powered mode of operation. As will be recognized, the interrupt allows the system to be operated in both a low power mode of operation and a high power mode of operation.

In some aspects, the integrated circuit and the MEMS circuit receive a clock signal from an external host. The clock signal is effective to cause the MEMS circuit and integrated circuit to operate in full system operation mode during a first time period and in a voice activity mode of operation during a second time period. The voice activity mode has a first power consumption or level and the full system operation mode has a second power consumption or level. The first power consumption is less than the second power consumption. The integrated circuit is configured to generate an interrupt upon the detection of voice activity, and send the interrupt to the host. The absence of a clock causes the microphone to enter a voice activity detection mode. The clock circuit may be located on the same chip as the other components or located externally.

In other aspects, the present approaches provide the ability to operate the internal clock at a third power consumption or level and thereafter generate an external data stream and clock to signal the system to operate at a fourth power consumption or level. The third power level is less than the fourth power level, and the fourth power level is less than the first power level.

In still other aspects, the external clock may be detected and this may be applied after the detection of voice activity. Then, the internal clock is synchronized to the external clock. Furthermore, the VAD signal processing is also synchronized to the external clock after synchronization.

In yet other aspects, the system may fall back to the internal clock for power savings at the first or second power level when the external clock is removed to reduce overall system power.

In another example, an external signal may be generated from the internal combination of the clock and the acoustic activity detection that acts as a signal and clock combination to signal the host to interrupt/wake up and recognize the voice signal. The bandwidth of the input signal after buffering may be in one example approximately 8 kHz. Other examples are possible. Data may be provided in PCM or PDM formats. Other examples of formats are possible.

Figure 2:
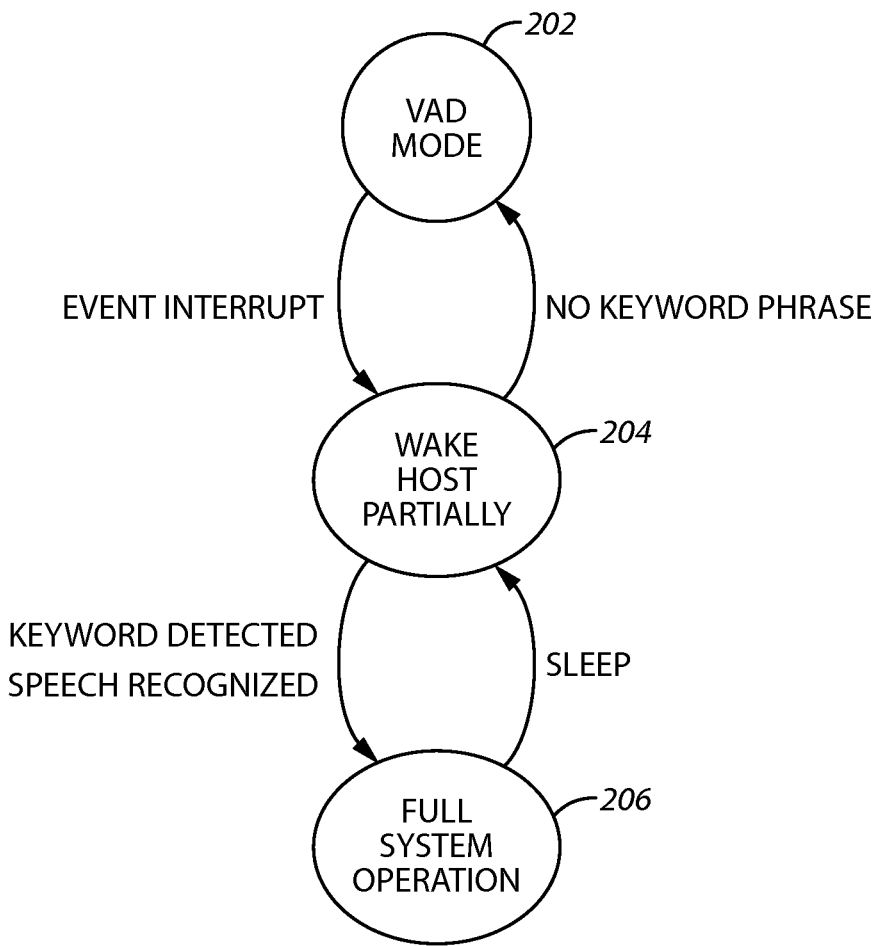
FIG. 2 is a diagram of the various states of a system that uses microphone that uses a VAD algorithm and includes power savings features.

Referring now to FIG. 2, various operational states of a system that uses a microphone that uses a VAD algorithm are described. The approach of FIG. 2 has three modes of operation: a VAD mode 202, a wake up host (partially) mode 204, and a full system operation mode 206.

In the VAD mode 202, no data is transmitted out of the microphone. The host is sleeping in this mode. In one aspect, when the host is sleeping only the functionality needed to react to a generated interrupt signal from the microphone is enabled. In this mode, the host is clocked at a very low clock to lower power and all unnecessary functionality is powered down. This mode has the absolute lowest power consumption possible as all unnecessary blocks are powered down and no switching of clock or data signals occur. In other words, the mode 202 is a low power mode, where VAD is enabled and no external clock is being received from the host.

In the wake up host (partially) mode 204, the external clock is received from the host. Data is transmitted out of the microphone. The host becomes partially awake due to the detection of a keyword and/or the detection of voice activity. Subsequently, the external clock for the microphone is enabled with a clock frequency corresponding to a higher performance level enough for doing reliable keyword detection.

The full system operation mode 206 is the high power or standard operating mode of the microphone.

In one example of the operation of the state transition diagram of FIG. 2, the system begins in mode 202. The VAD algorithm detects an event which will trigger the transition from VAD mode 202 to partially wake up/wake up mode 204.

In the mode 204, the host detects a keyword/speech and decides that a specific key word, phrase, or sentence is recognized. This determination triggers the transition from the mode 204 to the full system wake up 206.

In the mode 206, the host keyword detect/speech recognition algorithm decides that no key word, phrase, or sentence is recognized which triggers the transition back to the VAD mode 202. In this respect, another mode or state (not shown here in FIG. 2) determines that the system should enter partially wake up/wake up mode 204 or go directly to the VAD mode 202.

Figure 3:
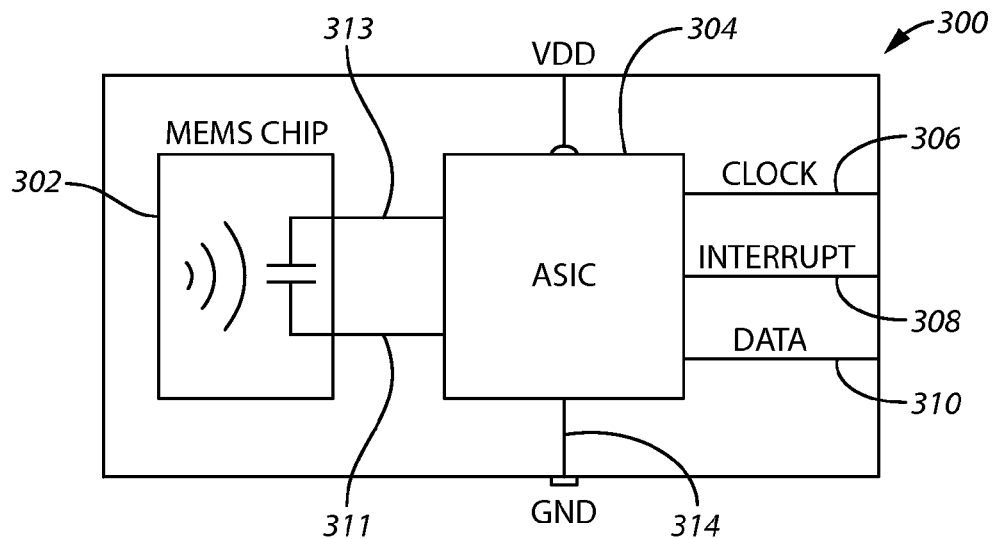
FIG. 3 is a block diagram of a microphone that uses a VAD algorithm and includes power savings features.

Referring now to FIG. 3, a microphone 300 that uses a VAD algorithm and includes power savings features is described. The microphone 300 includes a microphone chip or device 302. The microphone chip 302 includes a MEMS die, diaphragm, and charge plate. The system also includes an ASIC 304. The ASIC 304 may include various processing functions. The MEMS chip 302 receives a charge pump signal 315 from the ASIC 304 to power the MEMS chip 302.

A VDD power signal 312 and a ground signal 314 are coupled to the ASIC 304. An interrupt signal 308 and a data signal 310 are sent by the ASIC 304 to a host (e.g., the host 104 of FIG. 1). A clock signal 306 sent from the host is received by the ASIC 304.

In one example of the operation of the microphone 300 of FIG. 3, the microphone 300 has several modes of operation and these are controlled by the clock signal 306. A voice signal is received by the MEMS chip 302 and this sound is converted into an electrical signal and sent over data lead 311 to the ASIC 304. The ASIC 304 processes the signal into a data signal and then transmits the data signal 310 from the ASIC 304 as well as creating an interrupt signal 308. The host (e.g., the host 104 of FIG. 1) generates the clock signal 306 and this controls the mode of operation of the microphone 300.

In one example, the microphone 300 includes a VAD mode of operation. In this mode, the microphone 300 has a very low power consumption, and it runs on a relatively low clock frequency which can be supplied either externally (from the clock signal 306 supplied by the host) or from an internal on-chip oscillator in the microphone 300. Consequently, when an interrupt is made, the low power operation can be changed to a higher powered operation. The interrupt allows the system to be operated in both a low power mode of operation and a high power mode of operation.

Figure 4:
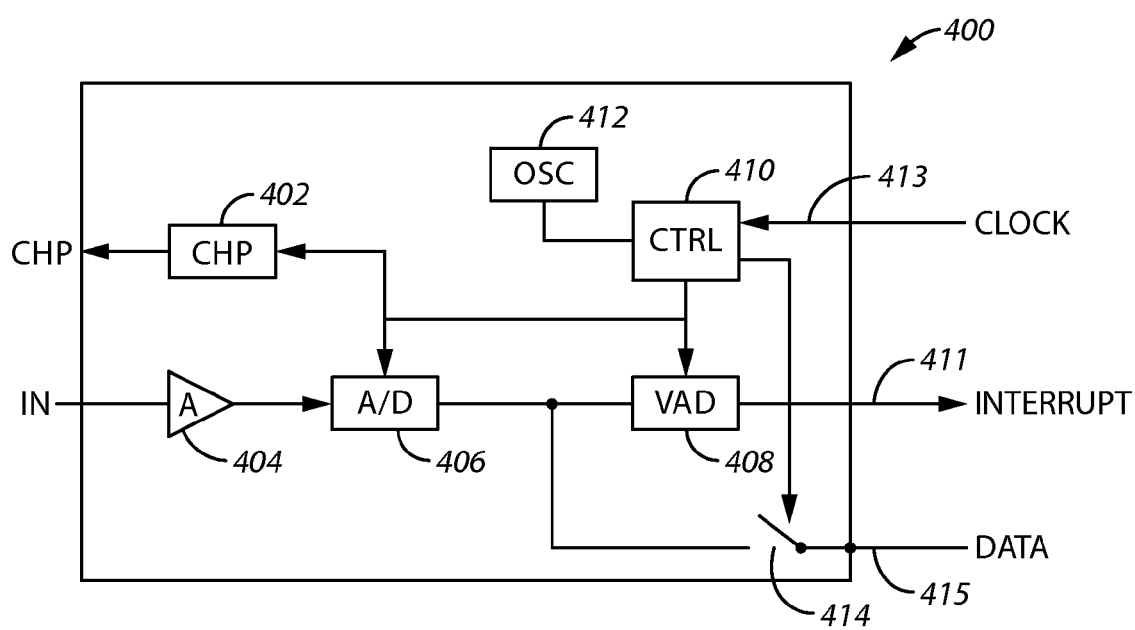
FIG. 4 is a block diagram of an application specific integrated circuit (ASIC)

Referring now FIG. 4, a block diagram of an application specific integrated circuit (ASIC) 400 is described. The ASIC 400 includes a charge pump (CHP) 402, an amplifier 404, an analog-to-digital converter 406, a voice activity detector (VAD) 408, a control block 410 (with oscillator 412), and a switch 414.

The charge pump CHP 402 charges the MEMS element (e.g., the MEMS chip 302 of FIG. 3) to convert changes in capacitance to voltage. The amplifier 404 buffers the electrical signal of the MEMS element (e.g., the MEMS chip 302 of FIG. 3) and subsequently amplifies the signal with a gain of A.

The A/D converter 406 converts the analog signal from the amplifier 404 to a digital signal. The VAD 408 processes the digital signal from the A/D converter 406 and generates an interrupt signal 411 if voice is detected. The control block 410 controls the internal states of the ASIC 400 in a response to an external clock signal 413 (received from a host) and the interrupt signal 411 from the VAD 408. The switch 414 is controlled by the control block 410 to allow data 415 to be sent to an external host.

A data buffer may be included at the output of the A/D converter 406. The buffer may buffer data representing the audio signal and correspond to or approximate the delay of the VAD 408 (e.g., 10 ms-360 ms to mention one example range with other ranges being possible). A decimation filter stage could be included at the output of the A/D converter in order to reduce buffer size (sampler RAM) and power, this will limit the bandwidth. In this case an interpolation stage at the buffer output must be added as well. In this case, the delay may be around 200 msec. In another example, the delay may be around 360 msec. Other examples of delay values are possible. The buffer is provided to allow any recognition algorithm the latency required to wake-up the host, collect sufficient background noise statistics, and recognize the key phrase within the ambient noise.

The buffered data may be sent to the host via some connection such as the interrupt line 411 or the data line 415. If sending data via the data line 415, it may be sent at an increased clock rate compared to the sampling clock.

Additionally, the parameters or settings of the VAD 408 may be changed or controlled. For example, the reading or writing settings of registers and memory (both erasable and non-erasable) of the VAD 408 may be changed or controlled to, for example, account for various levels of background noise.

The functionality of the VAD 408 may be enhanced or changed. For example, voice or phrase detection may be used. Other functions may also be included.

Figure 5:
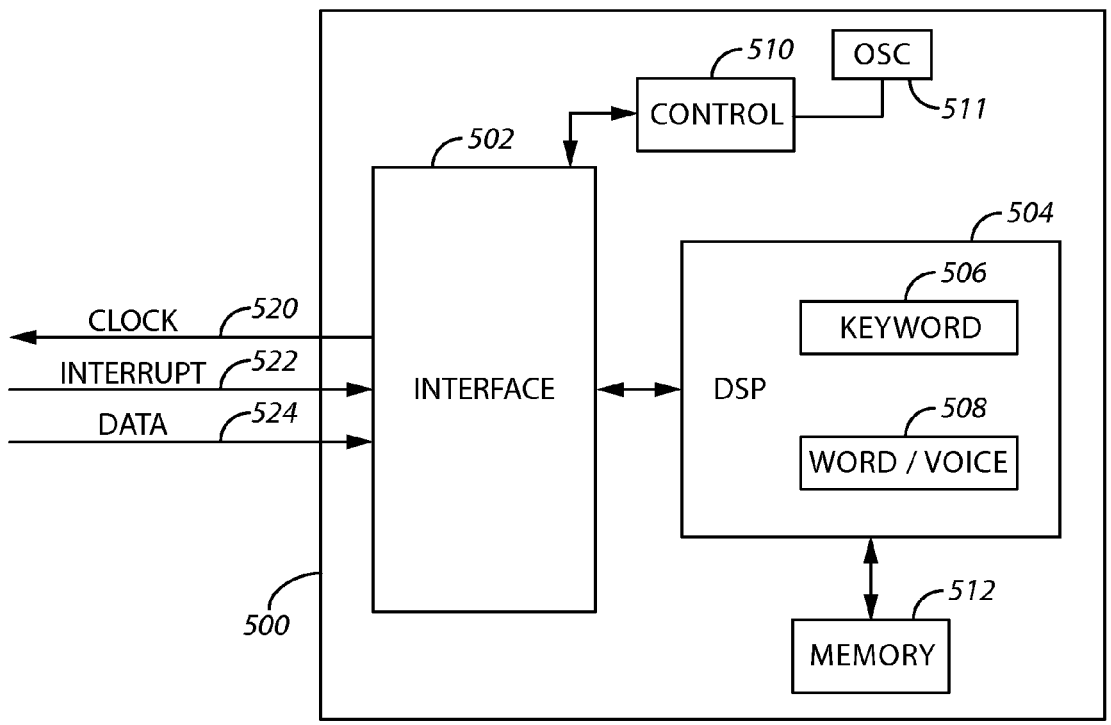
FIG. 5 is a block diagram of a host.

Referring now FIG. 5, a block diagram of host 500 is described. The host 500 includes an interface block 502, a digital signal processing (DSP) block 504 (including a keyword detection block 506 and word/voice recognition block 508), a control block 510 (clocked by an on-chip oscillator 511), and a memory 512.

The interface block 502 provides interfacing functionality with respect to a microphone (e.g., the microphone 102 in FIG. 1). The interface block transmits the clock signal 520 to the microphone and receives from the microphone an interrupt signal 522 and a data signal 524. The DSP block processes the data signal in two steps using the keyword detection block 506 (detecting a keyword) and the word/voice recognition block 508 (detecting a word or voice).

The control block 510 controls the power states of the microphone (e.g., the microphone 102 of FIG. 1), the blocks of the host 500, and the entire system including other blocks and functions outside the host and microphone (not shown here in FIG. 5).

The memory 512 stores the states of the system, data, and other information. The on chip oscillator 511 is controllable from the control block 510 and enables at least two clock modes corresponding to at least two power modes.

Figure 6:
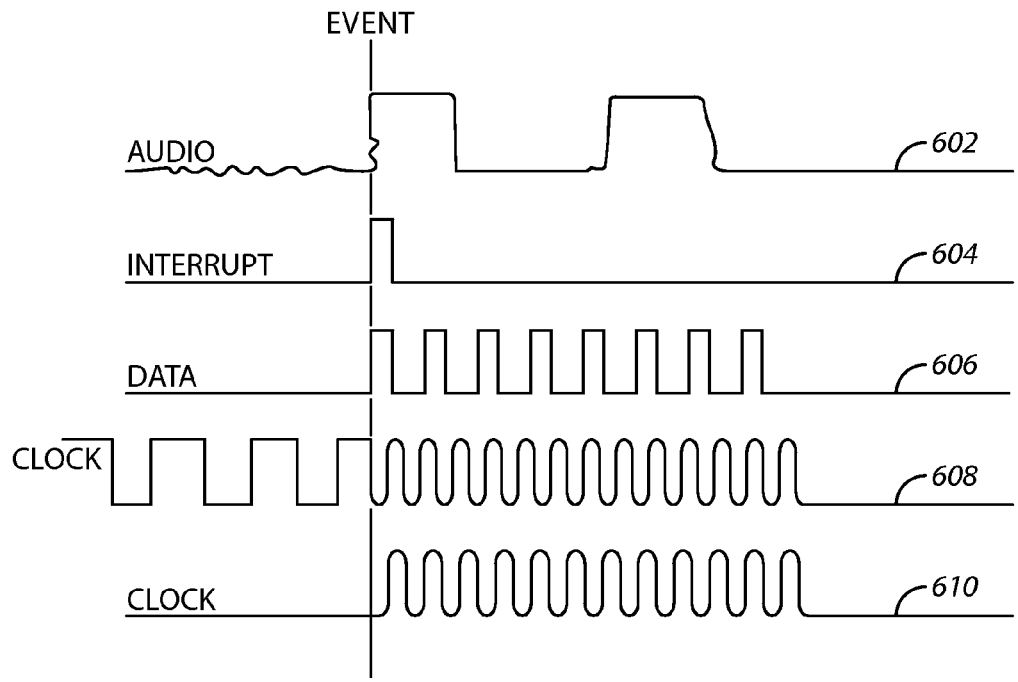
FIG. 6 is a timing diagram showing the operation of a microphone that uses a VAD algorithm and includes power savings features.

Referring now FIG. 6, a timing diagram showing the operation of a microphone that uses a VAD algorithm and includes power savings features is described. The signals of FIG. 6 show how the system and in particular how the microphone reacts to a voice/event signal and generates an interrupt signal. Subsequent to the interrupt signal, the diagrams show how the host reacts to the interrupt signal by changing its mode and afterwards changing the frequency of the clock signal to change the mode of the microphone.

Signal 602 shows an audio signal. Upon detection of an audio signal, the microphone generates an interrupt as shown by signal 604. Data is also generated by the microphone as shown by signal 606. As can be seen by signal 608, the host in response to the interrupt changes the clock signal (sent to the microphone) from a low frequency signal to a high frequency signal. Alternatively (as shown by signal 610), in low power mode (before the event), the host may not send a clock signal and may only start the high frequency clock signal upon detection of the event.

Preferred embodiments of this disclosure are described herein, including the best mode known to the inventor(s). It should be understood that the illustrated embodiments are exemplary only, and should not be taken as limiting the scope of the appended claims.

What is claimed is:
1. A microphone comprising:
a microelectromechanical system (MEMS) circuit configured to convert a voice signal into an electrical signal,
an integrated circuit coupled to the MEMS circuit, the integrated circuit including a voice activity detector that determines whether voice is present in data representative of the electrical signal;

the integrated circuit has a first mode of operation when the data is not provided to an external-device interface of the microphone and a second mode of operation when the data is provided to the external-device interface, the first mode of operation having a first power consumption and the second mode of operation having a second power consumption, the first power consumption being less than the second power consumption, the integrated circuit configured to provide an interrupt signal to the external-device interface after detection of voice activity in the data;

the integrated circuit includes a buffer in which the data representative of the electrical signal is buffered in order to provide time for the integrated circuit to process the data representative of the electrical signal;

wherein the integrated circuit selectively provides the buffered data to the external-device interface at an overclocked rate after detection of voice activity.

2. The microphone of claim 1, further comprising a local oscillator, the integrated circuit clocked by an internal clock signal based on the local oscillator.

3. The microphone of claim 1, wherein the integrated circuit is configured to provide real-time data to the external-device interface with the buffered data after detecting voice activity.

4. A method in a microphone comprising an acoustic sensor packaged with an integrated circuit, the method comprising:

performing voice activity detection on data obtained from an electrical signal produced in response to acoustic input to the microphone to detect voice activity;

buffering the data while performing voice activity detection;

clocking the microphone with an internal clock signal based on a local oscillator of the microphone;

providing the buffered data at an external-device interface of the microphone after detection of the voice activity; and compensating for delay attributed to the buffering when providing the buffered data at the external-device interface of the microphone by providing the buffered data at the external-device interface at an overclocked frequency after detection of the voice activity.

5. The method of claim 4, further comprising operating the microphone in a first mode when the buffered data is not provided at the external-device interface, and operating the microphone in a second mode when the buffered data is provided at the external-device interface, a power consumption of the first mode less than a power consumption of the second mode.

6. The method of claim 4, further comprising providing real-time data with the buffered data at the external-device interface after detecting voice activity.

7. The method of claim 6, further comprising providing the buffered data at a first output of the external-device interface and providing the real-time data at a second output of the external-device interface.

8. The method of claim 4, further comprising:

obtaining the data by sampling the electrical signal at a sampling frequency, wherein compensating for delay attributed to buffering comprises clocking the buffered data provided at the external-device interface at a frequency greater than the sampling frequency.

9. The method of claim 4 further comprising:

providing an interrupt signal at the external-device interface upon detecting voice activity, receiving an external clock signal at the external-device interface in response to providing the interrupt signal, and clocking the microphone based on the external clock signal received at the external- device interface.

10. The method of claim 9, wherein the clocking the microphone based on the external clock signal includes synchronizing the internal clock signal with the external clock signal.

11. The method of claim 9, further comprising operating the microphone in a first mode when the buffered data is not provided at the external-device interface and operating the microphone in a second mode when the buffered data is provided at the external-device interface, wherein a power consumption of the first mode is lower than a power consumption of the second mode.

12. A microphone comprising:

an acoustic sensor having an output with an electrical signal produced in response to acoustic input at the acoustic sensor;

an integrated circuit packaged with the acoustic sensor, the integrated circuit including a controller coupled to a local oscillator, a voice activity detector, and a buffer, the integrated circuit clocked by an internal clock signal, the internal clock signal based on an output of the local oscillator, the output of the acoustic sensor coupled to the buffer and to the voice activity detector, data obtained from the electrical signal buffered at the buffer while the data is processed by the voice activity detector, the controller providing the buffered data at an external-device interface of the microphone after detection of voice activity, the buffered data at the external-device interface compensated for delay attributed to buffering, wherein the buffered data is provided at the external-device interface at an overclocked frequency.

13. The microphone of claim 12, the microphone having a first mode of operation when the buffered data is not provided at the external-device interface and a second mode of operation when the buffered data is provided at the external-device interface, a power consumption of the first mode of operation less than a power consumption of the second mode of operation.

14. The microphone of claim 12, the integrated circuit providing real-time data at the external-device interface with the buffered data provided at the external-device interface.

15. The microphone of claim 14, the external-device interface having a first output and a second output, the real-time data provided at the first output and the buffered data provided at the second output.

16. The microphone of claim 12, the buffer having a delay at least as long as a processing delay of the voice activity detector, wherein the buffer delay provides time for the voice activity detector to process the data.

17. The microphone of claim 12, wherein:

the integrated circuit includes an A/D converter coupled to the controller, an input of the A/D converter coupled to the output of the acoustic sensor, an output of the A/D converter coupled to an input of the buffer and to an input to the voice activity detector, a clock frequency of the buffer greater than a sampling frequency of the A/D converter when buffered data is provided at the external-device interface.

18. The microphone of claim 17, wherein:
the external-device interface includes an interrupt signal output and an external clock signal input,
the internal clock signal is based on an external clock signal present at the external clock signal input, and
an external clock signal is present at the external-device interface in response to an interrupt signal provided at the interrupt signal output.

19. The microphone of claim 12, wherein the acoustic sensor is a microelectromechanical systems (MEMS) sensor.

* * * * *